US012116981B2

(12) United States Patent
Elmose et al.

(10) Patent No.: US 12,116,981 B2
(45) Date of Patent: Oct. 15, 2024

(54) COMPENSATING GRAVITY CYCLES OF A PITCHING SYSTEM

(71) Applicant: Siemens Gamesa Renewable Energy A/S, Brande (DK)

(72) Inventors: Søren Forbech Elmose, Bording (DK);
Thomas Esbensen, Herning (DK);
Gustav Hoegh, Vejle (DK); Tommy Hastrup Knudsen, Karup J (DK);
Peder Bay Enevoldsen, Vejle (DK);
Eduardo Raymaska Wiputra, Westminster, CO (US)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 18/039,185

(22) PCT Filed: Nov. 17, 2021

(86) PCT No.: PCT/EP2021/081958
§ 371 (c)(1),
(2) Date: May 26, 2023

(87) PCT Pub. No.: WO2022/117342
PCT Pub. Date: Jun. 9, 2022

(65) Prior Publication Data
US 2024/0003332 A1    Jan. 4, 2024

(30) Foreign Application Priority Data
Dec. 3, 2020  (EP) .................................. 20211406

(51) Int. Cl.
*F03D 7/02*  (2006.01)

(52) U.S. Cl.
CPC ........ *F03D 7/0224* (2013.01); *F05B 2270/32* (2013.01); *F05B 2270/326* (2013.01); *F05B 2270/328* (2013.01)

(58) Field of Classification Search
CPC .... F03D 7/0224; F03D 7/0296; F03D 7/0298; F05B 2260/96; F05B 2270/32; F05B 2270/6262; F05B 2270/328
See application file for complete search history.

(56) References Cited

U.S. PATENT DOCUMENTS

| 11,460,002 B2 * | 10/2022 | Couturier ................ F16F 15/30 |
| 2011/0138945 A1 * | 6/2011 | Watanabe ............... F16H 57/12 |
| | | 74/409 |

(Continued)

FOREIGN PATENT DOCUMENTS

| CN | 110030155 A | 7/2019 |
| DE | 102010035055 A1 | 2/2012 |
| EP | 2495435 A1 | 9/2012 |

OTHER PUBLICATIONS

Trudnowski D et al: "Independent pitch control using roter position feedback for wind-shear and gravity fatigue reduction in a wind turbine", Proceedings of The 2002 American Control Conference. Acc. Anchorage, AL, (American Control Conference), New York, NY : IEEE, US, vol. 6, pp. 4335-4340, XP010597604, DOI: 10.1109/ACC.2002.1025328; ISBN: 978-0-7803-7298-6 the whole document; 2002.

(Continued)

*Primary Examiner* — Sang K Kim
(74) *Attorney, Agent, or Firm* — Schmeiser, Olsen & Watts LLP

(57) ABSTRACT

A method of controlling a pitching system of a rotating rotor blade of a wind turbine includes: controlling the pitching system such that unintended pitching due to gravity is reduced.

14 Claims, 6 Drawing Sheets

(56) References Cited

U.S. PATENT DOCUMENTS

| | | |
|---|---|---|
| 2012/0134806 A1 | 5/2012 | Andersen |
| 2016/0138571 A1* | 5/2016 | Perley ................... F03D 17/00 |
| | | 702/42 |
| 2022/0025862 A1* | 1/2022 | Wegmann ............ F03D 17/014 |
| 2022/0220937 A1* | 7/2022 | Thomsen ............. F03D 7/0296 |

OTHER PUBLICATIONS

European Search Report issued on May 26, 2021 for application No. 20211406.2.

International Search Report and Written Opinion of the International Searching Authority issued on Jan. 31, 2022 for application No. PCT/EP2021/081958.

\* cited by examiner

COMPENSATING GRAVITY CYCLES OF A PITCHING SYSTEM

CROSS-REFERENCE TO RELATED APPLICATIONS

This application claims priority to PCT Application No. PCT/EP2021/081958, having a filing date of Nov. 17, 2021, which claims priority to EP Application No. 20211406.2, having a filing date of Dec. 3, 2020, the entire contents both of which are hereby incorporated by reference.

FIELD OF TECHNOLOGY

The following relates to a method and to an arrangement of controlling a pitching system of a rotating rotor blade of a wind turbine such that an unintended pitching due to the gravity is reduced. Furthermore, the following relates to a wind turbine comprising the arrangement.

BACKGROUND

Conventionally, a wind turbine comprises a pitching system for each of the rotor blades, in order to adjust the pitch angle of the respective rotor blade. Adjustment of the pitch angle may increase or decrease the lifting force generated through or by the rotor blade due to airflow flowing around the wind turbine blade.

Conventionally, it has been observed that a wind turbine pitching system may suffer from substantial wear or load or even damaging events during operation. The load on a pitch bearing may reduce performance of the wind turbine and may require increased maintenance service. Conventionally, pitch bearing damage (PBD) may be an important turbine design constraint that can be evaluated as a duration fatigue. Thereby, the pitch bearing damage may depend on the amount of pitch activity and the loading on the pitch bearing, e.g. originating from blade mass (moment) and gravity and wind loading. Additional and unintended pitch bearing damage may result in higher/heavier/more expensive blade pitch bearings.

An aspect relates to provide a method and a corresponding arrangement of controlling a pitching system of a rotating rotor blade of a wind turbine, wherein load on a pitch bearing is reduced.

SUMMARY

According to an embodiment of the present invention it is provided a method of controlling a pitching system of a rotating rotor blade of a wind turbine, the method comprising: controlling the pitching system such that unintended pitching due to gravity is reduced.

The method may for example be implemented in software and/or hardware and may for example be performed by a wind turbine controller. The wind turbine may comprise a rotor at which multiple rotor blades are connected. Each of the rotor blades may comprise a respective pitching system which may be configured for adjusting and/or fixing a respective pitch angle of the rotor blade by rotating the rotor blade around a longitudinal axis of the rotor blade. The pitching system may comprise one or more actuators, including for example hydraulic actuators, electric actuators, pistons, etc. for adjusting the pitch angle of the rotor blade. Alternatively or additionally, the pitching system may comprise at least one brake and is configured for prohibiting rotation of the rotor blade around the longitudinal axis, i.e. configured for disabling pitching the rotor blade, thus for fixing the blade pitch angle. The pitching system may in particular comprise a hydraulic pitching system, wherein the pitch angle is adjustable by moving one or more pistons which are driven by a liquid which is filled into a container, such as a cylinder. The liquid may comprise oil which may be pressurized by a pressuring system.

Controlling the pitching system may comprise to actually drive an actuator which is configured to apply a torsion or a moment to the rotor blade in order to counteract an opposing torsion or moment which is due to gravity acting on the rotor blade. In other embodiments, additionally or alternatively, the pitching system may merely fix the adjusted or set pitch angle by locking the rotor blade relative to the hub at which the rotor blade is connected with a root portion. Actuating the brake and/or actuating the actuator for generating a moment or torsion on the rotor blade may be performed separately or in combination. The controlling of the pitching system such that unintended pitching due to gravity is reduced will also be referred to in the present application as "gravity compensating control".

In conventional systems, due to gravity and wind loads and flexibility or backlash of the pitching system, blade bearings may be experiencing unintended pitching not commanded by the wind turbine controller. The movements of the rotor blade due to gravity is also referred to as "gravity pitching" in the present application. The "gravity pitching" conventionally may introduce a sinusoidal pitch motion of the bearing once per revolution of the rotor. The gravity pitching may have a range between 0.05 to 0.3 degrees.

Embodiments of the present invention control the pitching system such that gravity pitching is counteracted in order to reduce its amplitude. Embodiments of the present invention may control the pitching system also depend on the operating point or operating parameters of the wind turbine and further depend on system properties, such as system hardware. In particular, for controlling the pitching system, the structural properties of the rotor blades and/or their geometric shapes may be considered. In particular, controlling the pitching system may be performed depending on the azimuthal position of the rotor blade which is being controlled regarding its pitch angle. This is because "gravity pitching" is expected to be depending on the azimuthal position of the rotor blade.

Gravity pitching may in conventional systems lead to undesired additional load or wear on the rotor blade pitch bearings. When the gravity compensating control is performed according to embodiments of the present invention, load and wear of the rotor blade pitch bearings may be reduced, thereby prolonging the lifetimes of the bearings.

Unintended pitching (due to gravity) may refer to a deviation between the actual pitch angle and a reference pitch angle representing the desired or demanded pitch angle. The reference pitch angle may for example substantially be constant in an operational range below the rated power output and/or below rated wind speed. Beyond rated power output and/or rated wind speed, the reference pitch angle may for example be adjusted towards the feather position in order to reduce the lifting force at higher wind speed. Thereby, a rated rotational speed may be kept constant and/or power output may be kept constant also in the high wind regime.

Controlling the pitching system of several rotor blades may substantially be performed phase-shifted, for example by a phase-shift of 120° for a wind turbine having three rotor blades. By the control method, load of components of the wind turbine may be reduced thereby increasing lifetime.

According to an embodiment of the present invention, controlling the pitching system comprises determining a control signal; supplying the control signal to the pitching system, wherein the control signal, in particular amplitude and/or phase, varies in dependence of rotational speed of the rotor, the control signal comprising a component being in particular defined by a periodic waveform having as a repetition period the revolution period of the rotor.

The control signal may be an optical and/or electrical and wireless signal. The control signal may be supplied for example via a communication network connecting different components of the wind turbine to for example the wind turbine controller. When the control signal varies in dependence of the rotational speed of the rotor, variabilities of the influence of gravity on the pitch system may be accounted for. The rotor blades may be mounted to the hub connected to the rotor such that the rotor axis is substantially perpendicular to a longitudinal direction of each of the rotor blades. The periodic waveform function may for example be a sine function, a cosine function, a square wave function, a sawtooth function, or other generic periodic waveform. The control signal may compose of a reference pitch angle signal and a periodic waveform component whose frequency varies depending on the revolution period of the rotor. Thereby, the dependency of the gravity due pitching from the azimuthal position may be accounted for.

According to an embodiment of the present invention, the control signal is supplied to a blade pitch angle actuator adapted to set the pitch angle, wherein the control signal is in particular determined as a sum of a reference pitch angle and a gravity induced pitching compensating signal, the gravity induced pitching compensating signal whose frequency depends on the revolution period of the rotor.

The blade pitch angle actuator may comprise or may be driven by a compression system including a compressed liquid, such as oil in order to drive pistons arranged within a cylinder. The reference pitch angle may represent the desired or intended or demanded pitch angle. In a particular operational regime, such as for example below rated power and/or below rated wind speed or below rated rotational speed, the reference pitch angle may substantially be constant. The gravity induced pitching compensation signal may be added to the reference pitch angle to obtain the control signal which is then supplied to the blade pitch angle actuator. Thereby, a demanded or desired pitch angle may be set in a reliable manner while gravity induced pitching is reduced.

According to an embodiment of the present invention, the control signal is determined based on a feedback signal, the feedback signal in particular comprising at least one of: an actual pitch angle indicating signal, indicating the, in particular measured, actual pitch angle of the rotor blade; an actual blade torsion indicating signal indicating the, in particular measured, actual torsion of the blade relative to a hub at which the blade is mounted, wherein actual blade torsion indicating signal in particular takes into account blade bearing friction.

The feedback signal may also comprise an optical and/or electrical and/or wireless signal. The feedback signal may for example be provided by one or more sensors for example being capable of sensing an actual pitch angle and/or an actual moment or torsion acting on the rotor blade relative to the hub. The actual blade torsion or moment indicating signal may for example be obtained by measuring the torsion using for example one or more strain sensors for example installed close to or at the blade root. Based on the feedback signal it may reliably be determined whether there is a deviation between the reference pitch angle and the actual pitch angle or whether there is the risk that a deviation between the reference pitch angle and the actual pitch angle will evolve in the future (for example due to relatively high torsion). Therefore, counteracting measures, by controlling the pitching system, may be taken according to embodiments of the present invention.

Conventional pitch servo systems may not react on deviations of the blade pitch angles from the reference pitch angles which are due to gravity, since those differences are relatively small. However, according to embodiments of the present invention, the control signal determined and supplied to the blade pitch angle actuator has a periodic waveform component whose frequency varies according to the revolution period of the rotor. Therefore, positive and negative deviations of the actual pitch angle from the reference pitch angle which are due to gravity pitching may reliably be compensated for, without unintended actuation driven by measured noise.

According to an embodiment of the present invention, the control signal is determined by comparing a measured pitch movement against an expected pitch movement; using the difference between the measured pitch movement and the expected pitch movement as the control signal or a part of the control signal to compensate the disturbance coming from the gravity pitch contribution.

The expected pitch movement may for example be determined based on a simulation or a model or based on previously acquired and analyzed training data. The expected pitch angle may be utilized and may be compared against the measured or actual pitch angle. Furthermore, the difference between the measured pitch angle and the expected pitch angle may be utilized in order to derive the control signal or a part of the control signal which is then utilized to compensate the disturbance coming from the gravity pitch contribution. Consequently, the control signal is continuously adapted (e.g. amplitude, phase, waveform shape) in order to properly compensate for the disturbance due to the gravity pitch.

The controlling the actuator or the blade pitch actuator may be such that the difference between the measured pitch angle and the expected pitch angle may be decreased. Therefore, load acting on the pitch bearing may be reduced.

According to an embodiment of the present invention, the control signal is determined further based on at least one wind turbine operation parameter, in particular comprising at least one of (to which embodiments of the invention is not restricted): a wind speed; a rotor azimuth; a rotor blade bending state; a rotational speed of the rotor; a rotational power of the rotor; a power output of a generator coupled to the rotor; a reference pitch angle; an actual pitch angle.

It has been found that the amplitude and/or phase of the gravity pitching may depend on one or more wind turbine operation parameters. Thus, taking into account one or more or all of these wind turbine operation parameters which affect the gravity pitching, may improve the method. The wind speed may influence the bending state of the rotor blade. Depending on the bending state in turn, the gravity pitching may vary. Clearly, the gravity pitching also depends on the rotor azimuth, i.e. depending on the direction of the respective rotor blade longitudinal axis in the plane being substantially perpendicular to the rotor axis. Furthermore, the other listed wind turbine operation parameters may influence the amplitude and/or phase of gravity induced pitching. Also, the set pitch angle, for example the reference pitch angle or the actual pitch angle, may influence the amplitude and/or phase of the deviation of the actual pitch angle from the reference pitch angle for example, e.g. due to different play or backlash at different pitch angles. The dependencies may for example be captured or defined in one or more look-up-tables, in one or more functional relationships or physical models.

According to an embodiment of the present invention, the control signal is determined based on the least one operation parameter using at least one of: a model modelling gravity induced pitching in dependence of the at least one operation parameter; a look up table listing the control signal in dependence of the at least one operation parameter; historical training data comprising observed gravity induced pitching in dependence of the at least one operation parameter; historical control training data comprising historical control signals that lead to intended compensation of observed gravity induced pitching in dependence of the at least one operation parameter.

The model may comprise a physical/mathematical model which may consider structural properties of the rotor blades, aerodynamic properties of the rotor blade, the mass distribution of the rotor blade and/or the geometry of the rotor blade. The look-up-table may have been prepared or created based on training data previously acquired and analyzed. For acquiring the historical training data, for example the actual pitch angle may be measured for multiple different wind turbine operational parameters and pitching system control signals. The control signal to be supplied to the blade pitch actuator may also be optimized in other embodiments in an iterative fashion for different combinations of values of wind turbine operation parameters, for example by iteratively changing the control signal, analyzing the effect of the change and then further changing the control signals in order to minimize the deviation between the reference of the blade pitch angle and the actual blade pitch angle.

According to an embodiment of the present invention, the blade pitch angle actuator comprises at least two pistons guided within two respective cylinders which are connected to a hydraulic system that is controlled based on the control signal, wherein the control signal is adapted to drive the pistons in order to reduce backlash.

Thereby, the blade pitch angle actuator may be implemented with conventionally available components. Ends of each of the pistons may comprise for example a swivel eye which encloses a bolt fixed to the blade root. The piston may be movable within a cylinder. The cylinders may be fixedly connected to the hub on one end. The filling state of the cylinders may be controlled by a compression system including a liquid, such as oil. By changing the filling state of the cylinder, the pistons may move and may therefore apply a torsion or moment on the rotor blade relative to the hub. Conventionally, there may be a particular play or backlash due to tolerances between inner diameters of the swivel eye and outside diameters of the fixed bolt on the blade root. The backlash or play may result in a deviation between the actual blade pitch angle and the reference blade pitch angle, in particular due to gravity pitching. According to this embodiment, the pistons are driven in order to reduce the backlash. The driving of the pistons may also be in dependence of the azimuthal position of the rotor blade and may be also in dependence on one or more of the wind turbine operational data as mentioned above. Thereby, in particular the load acting on the blade pitch bearings may be reduced using conventional components and actuators.

According to an embodiment of the present invention, the control signal is determined such that to drive the pistons: in different directions towards restricting pitching movement, in case of torsion fluctuating is around or close to zero; and/or in same direction enabling readjusting the pitch angle, if the torsion is positive or negative, wherein the control signal is in particular set to the reference pitch angle, in case the reference pitch angle is changing.

If the torsion fluctuates around zero or is close to zero, it may be indicated that the play or the backlash is too high. In this situation, the pistons are controlled in different or in particular opposite directions. Thereby, play or backlash may be reduced. When the pistons are moved or readjusted in the same direction, actually changing of the pitch angle may be affected or an expected movement may be counteracted. This may be performed when the torsion is due to gravity pitching, i.e. this may be performed depending for example on the azimuthal position of the rotor blade and further other operational parameters as listed above. The actuating the pistons or driving the systems may also be performed by a partly periodic waveform signal as described above which has the period of the revolution of the rotor. Additionally or alternatively to the above-described embodiments, the pitching system may comprise at least one brake.

According to an embodiment of the present invention, the pitching system comprises at least one brake, wherein controlling the pitching system comprises, in particular in case the reference pitch angle does not change, in particular below rated power (to which embodiments of the invention is not restricted): actuating the at least one brake, in order to reduce or prohibit unintended rotation of the blade around its longitudinal axis.

The brake may be actuated, such that the rotor blade is effectively locked relative to the hub, such that rotation around the longitudinal axis is prohibited. Braking the rotor blade using the brake may in particular be performed in all situations or in all time ranges, in which the pitch angle is intended to be fixed, for example during time ranges wherein the reference pitch angle is substantially constant. The brake may comprise one or more components, such as mechanical brake portions, electrical brake portions, hydraulic brake portions.

According to an embodiment of the present invention, the brake comprises at least one of the following: a mechanical brake applying form fit and/or force fit; a hydraulic brake.

A mechanical brake may e.g. be implemented using one or more blocking valves and/or a mechanical locking function on the pitch actuator and/or one or more brake calipers. E.g. blocking valves can be added on one side or both sides of one or more (hydraulic) pitch actuators to keep the compressible oil volume low. By appropriately operating the valves it may be also possible to increase the pressure in the actuators and thereby reducing the compressibility of the oil and minimizing the movement. A mechanical locking function on the pitch actuator can e.g. be engaged either electrically or hydraulically and lock or brake the movement of the actuator and thereby limiting the flexibility of the system and reducing gravity pitch. One or more brake calipers e.g. similar to the rotor brake can be mounted to the blade bearing preventing the movement of the bearing.

The hydraulic brake may partly or completely be formed by a conventional pitching system or a blade pitch actuator. For using the blade pitch actuator as a brake, for example a locking state may be set up, wherein for example pistons are acting in opposite directions, as has been explained or described above. Thereby, an effective braking of the rotor blade is enabled.

According to an embodiment of the present invention, the blade pitch angle actuator is configured as hydraulic actuator to be operated to act as at least a part of the brake by at least one of the following: minimizing compression of oil; increasing pressure of oil.

When the compression of oil is minimized, the backlash or the play may be reduced. When the pressure of the oil is increased, also the backlash or the play may be decreased.

According to an embodiment of the present invention, the method is adapted to reduce load on a pitch system bearing of the rotor blade; and/or applied to all rotor blades of the wind turbine, wherein the control of pitching systems of adjacent blades is performed with a phase shift of 360°/n, where n is the number of rotor blades.

For example, a respective control signal for one rotor blade of the multiple rotor blades may be determined and then this control signal or at least the respective gravity induced pitching compensating signal may be phase-shifted to be applied to the adjacent rotor blade. Thereby, computational efforts may be reduced.

It should be understood, that features, individually or in any combination, described, explained, provided or applied to a method of controlling a pitching system of a rotor blade may also be, individually or in any combination, applied or provided for an arrangement for controlling a pitching system of a rotating rotor blade according to embodiments of the present invention and vice versa.

According to an embodiment of the present invention it is provided an arrangement for controlling a pitching system of a rotating rotor blade of a wind turbine, the arrangement comprising a controller adapted to: control the pitching system such that unintended pitching due to gravity is reduced.

The arrangement may for example be implemented in hardware and/or software and may be a portion of a wind turbine controller.

The arrangement may comprise one or more sensors which are capable for example to measure an actual blade pitch angle and/or a torsion or moment between the rotor blade and the hub.

According to a further embodiment of the present invention it is provided a wind turbine, comprising multiple rotor blades having respective pitching systems; and an arrangement according to the preceding embodiment, connected to control the pitching systems.

The aspects defined above and further aspects of embodiments of the present invention are apparent from the examples of embodiment to be described hereinafter and are explained with reference to the examples of embodiment. Embodiments of the invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a wind turbine according to an embodiment of the present invention including an arrangement according to an embodiment of the present invention;

Figure 8:
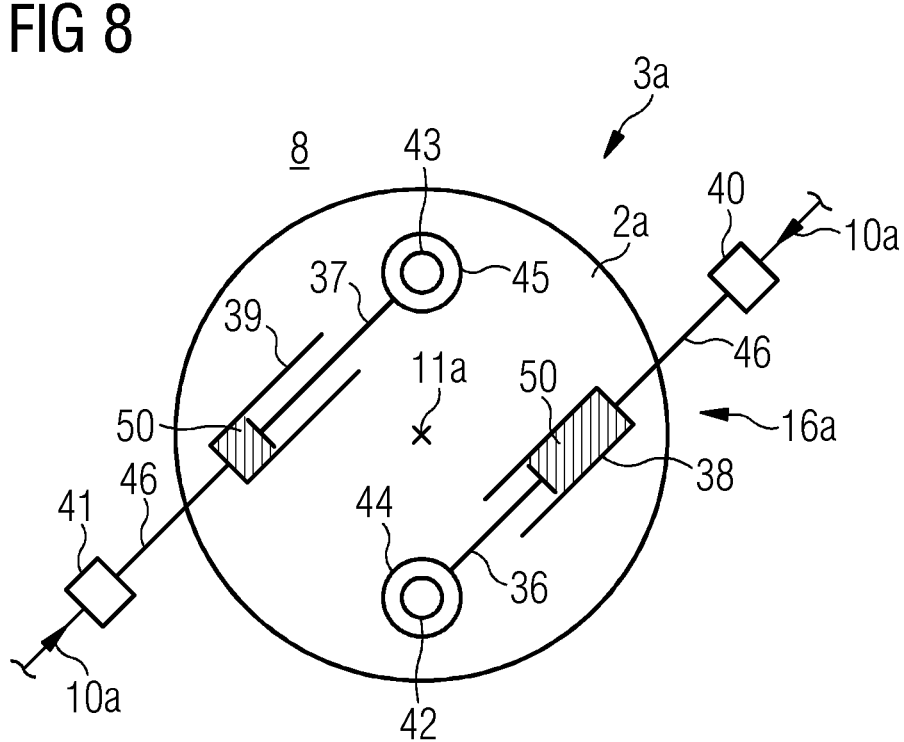
Figure 9:
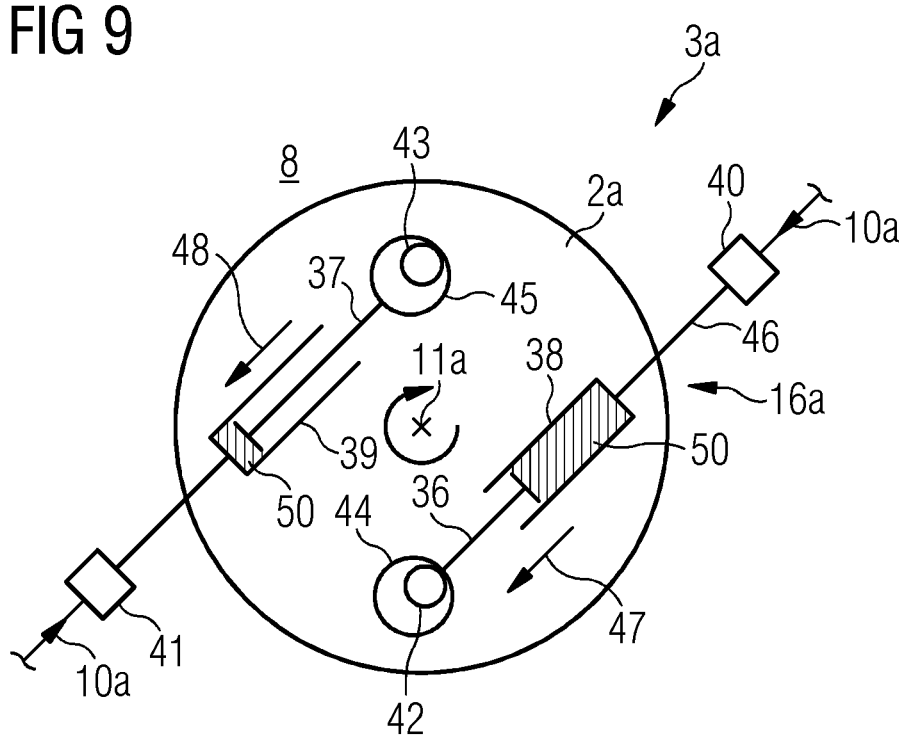

FIG. 8 schematically illustrates a pitching system as employed in a first state according to embodiments of the present invention; and FIG. 9 schematically illustrates a pitching system as employed in a second state according to embodiments of the present invention.

DETAILED DESCRIPTION

Figure 1:
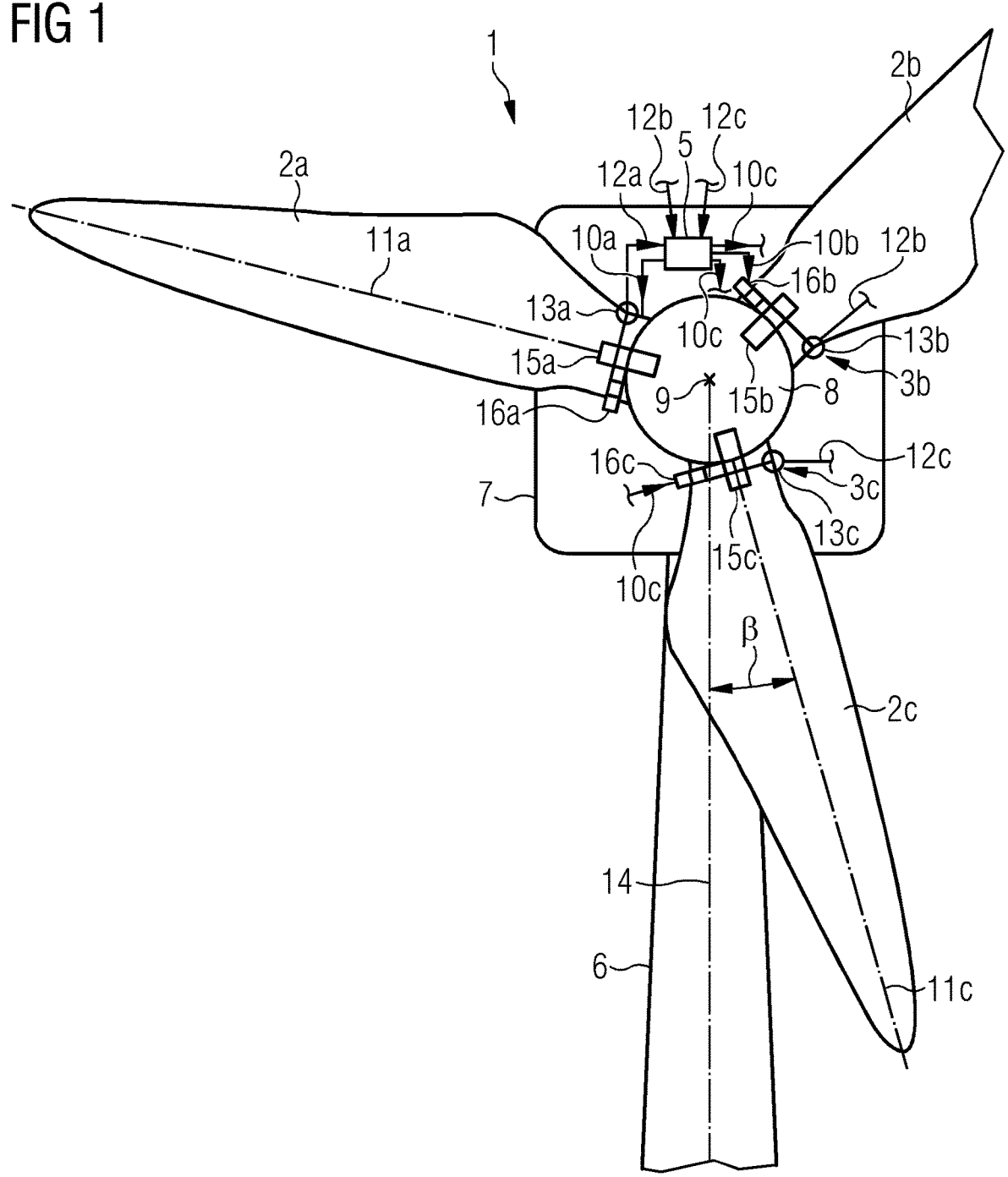

The wind turbine 1 schematically illustrated in FIG. 1 comprises multiple rotor blades 2a,b,c having respective pitching systems 3a,b,c and an arrangement 5 according to an embodiment of the present invention for controlling the pitching systems 3a,b,c of the rotating rotor blades 2a,b,c of the wind turbine 1.

The wind turbine 1 comprises a wind turbine tower 6 on top of which a nacelle 7 is mounted. The nacelle 7 comprises a rotatably supported rotor 8 having a rotation axis 9 being perpendicular to the drawing plane of FIG. 1. The multiple rotor blades are mounted on the rotor 8, in particular on a hub at an end of the rotor 8.

The arrangement 5 is communicatively connected to the pitching systems 3a,b,c enabling to control the pitching systems 3a,b,c such that unintended pitching due to gravity is reduced. Thereby, the arrangement 5 is configured to perform a method of controlling the pitching systems 3a,b,c such that unintended pitching due to gravity is reduced. The pitching due to gravity will be described in detail below with reference to FIGS. 2 and 3.

Figure 4:
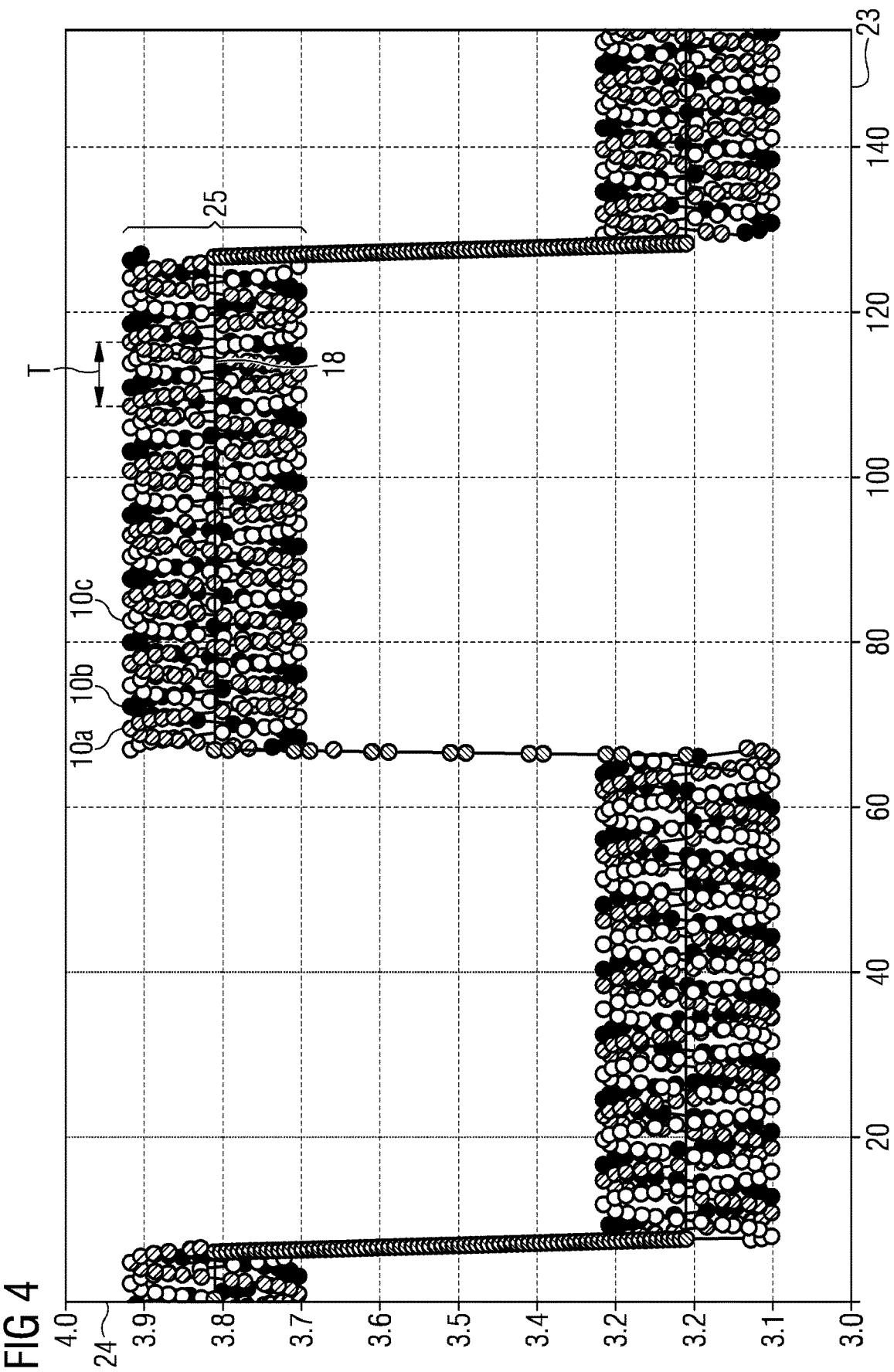
FIG. 4 illustrates a time course of a control signal for controlling a pitching system according to an embodiment of the present invention.

During the method performed by the arrangement 5, a control signal is determined and supplied to the pitching systems 3. The control signal 10a is supplied to the pitching system 3a of the rotor blade 2a. Similarly, control signals 10b, 10c are supplied to the pitching systems 3b, 3c, respectively, of the wind turbines 2b and 2c, respectively. Therein, the control signals 10a,b,c may be determined in dependence of a rotational speed of the rotor 8. Examples of a control signal are illustrated in FIG. 4 described in detail below.

The control signals 10a, 10b, 10c may be supplied to respective blade pitch actuators 16a,b,c which are comprised in the pitching systems 3a, 3b, 3c. The blade pitch angle actuators comprised in the pitching systems 3a, 3b, 3c are adapted to set the pitch angle, by rotating the respective rotor blade around a longitudinal axis 11a, 11b, 11c, respectively.

In the embodiment illustrated in FIG. 1, the arrangement 5 receives respective feedback signals 12a, 12b, 12c from respective sensors 13a, 13b, 13c installed at the respective rotor blades 2a, 2b, 2c. The feedback signals 12a, 12b, 12c may for example indicate the actual pitch angle and/or the actual blade torsion acting on the rotor blade.

The control signals 10a, 10b, 10c may also be determined based on at least one wind turbine operation parameter such as wind speed, rotor azimuth, rotor blade bending state, rotational speed of the rotor, rotational power of the rotor, power output of the generator coupled to the rotor, a reference pitch angle and or an actual pitch angle.

The rotor azimuth may for example indicate the angle between the longitudinal axis 11c and a vertical 14 wherein this angle is labelled in FIG. 1 as β.

The pitching system 3a, 3b, 3c may, in addition to the blade pitch actuators 16a,b,c, also comprise at least one brake 15a,b,c which is configured to lock the pitching system, such that a rotation around the respective longitudinal axis 11a, 11b, 11c is prohibited. The blade pitch actuators 16a, 16b, 16c may be constructed as conventional blade pitch angle actuators. The brakes 15a, 15b, 15c may be configured as mechanical brake and/or hydraulic brake.

Figure 2:
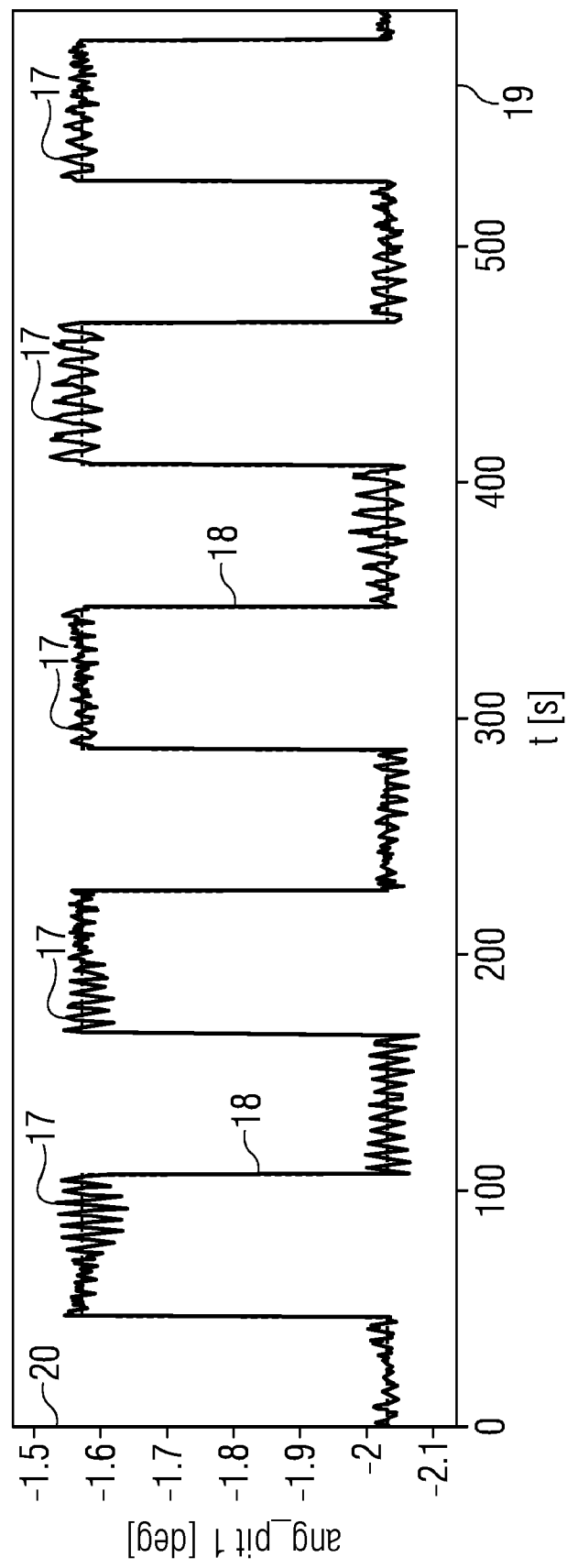
FIG. 2 illustrates a time series of a measured blade bearing pitch angle of a rotor blade, as considered in embodiments of the present invention.

FIG. 2 illustrates a time series 17 of a measured blade pitch angle 17 in comparison with a reference pitch angle 18. Therein, an abscissa 19 indicates the time, while the ordinate 20 indicates the pitch angle. As can be appreciated from FIG. 2, the actually measured blade pitch angle 17 deviates from the reference blade pitch angle 18. In particular, the actual pitch angle 17 fluctuates around the reference pitch angle 18 and oscillates with a repetition period T which corresponds to the period of revolution of the rotor 8, denoted as 1P component. Thus, the actual pitch angle 17 comprises a 1P component, thus a component having a frequency of the revolution frequency of the rotor. The oscillating component is also referred to as gravity pitch or gravity induced pitching. The oscillating part of the actual pitch angle 17 causes undesired load on the pitch bearing.

According to embodiments of the present invention, the oscillating part of the actual pitch angle is reduced or even avoided by controlling the respective pitching systems. According to embodiments of the present invention, a control signal, such as control signal 10a, 10b, 10c, illustrated in FIG. 1, is injected that aims to cancel out the movement "gravity pitching". Therein, the control signals 10a, 10b, 10c may either be scheduled (for example represented or calculated by a model), may be derived from measured quantities, or may be estimated.

Figure 3:
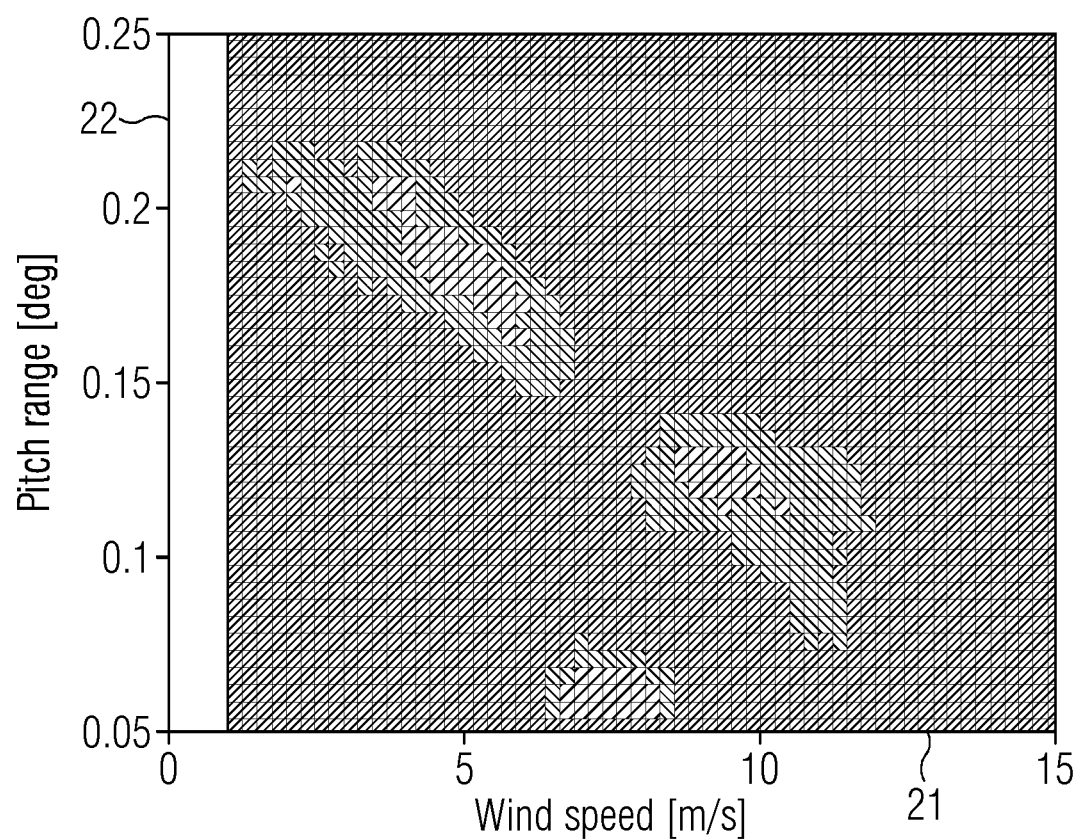
FIG. 3 illustrates the dependency of a degree of gravity pitching as considered in embodiments of the present invention.

FIG. 3 illustrates a plot illustrating the amplitude of the oscillating portion of the actual pitch angle 17 illustrated in FIG. 2 in dependence on the wind speed on the first axis 21 and the pitch range on the other axis 22 in degrees. As can be seen from FIG. 3, at a wind speed of about 5 m/s, the pitch amplitude due to gravity pitching ranges at around 0.19°. For a wind speed of around 7.5 m/s, the amplitude of the pitch due to gravity ranges at around 0.05° and at a wind speed of around 9 m/s, the pitch angle due to gravity pitching ranges to about 0.125. Thus, the pitch angle error or wrong positioning due to gravity pitching depends on the wind speed and further may depend on other operational parameters. These dependencies of the blade pitch angle wrong positioning/movements may be considered in embodiments of the present invention.

FIG. 4 schematically illustrates a time series of control signals 10a, 10b, 10c supplied to the respective pitching systems 3a, 3b, 3c, in particular blade pitch actuators 16a, 16b, 16c, of the rotor blades 2a, 2b, 2c, respectively, according to an embodiment of the present invention. Therein, the abscissa 23 indicates the time and the ordinate 24 indicates the value or amplitude of the control signal. The curve 18 represents the reference pitch angle. Exemplary, the reference pitch angle 18 is a sinusoid shaped signal. In other embodiments, the reference pitch angle may for example be constant or may develop with time according to any curve being different from a constant or being different from sinusoid.

As can be appreciated from FIG. 4, the control signals 10a, 10b, 10c supplied to the pitch actuators of the three different blades are phase-shifted with respect to each other, in particular by 120° in terms of the frequency of the rotation of the rotor 8. This is due to the dependency on the gravity pitching on the rotor azimuth. Furthermore, from FIG. 4 it can be appreciated that the control signals 10a, 10b, 10c may be described as a sum of the reference pitch angle 18 and a gravity induced pitching compensating signal which is labelled with reference sign 25. The oscillating signal 25, i.e. the gravity induced pitching compensating signal 25 has a repetition period T which is equal to the revolution period of the rotor 8. The amplitude and/or phase of this gravity induced pitching compensating signal 25 may depend on at least one wind turbine operational parameter.

Thus, the injection signal or control signal 10a, 10b, 10c may be expressed as a pitch offset sent to the respective pitching systems. According to an embodiment of the present invention, if the respective pitch bearing is expected or observed to move in one direction, a command can be sent to the respective pitching system to actuate in the opposite direction. This may be balanced, such that the bearing will not move, or at least not move due to gravity, but only as the wind turbine controller intends it to do.

To determine the control signals 10a, 10b, 10c, several different methods may be applied, as is described in the following and which may be combined:

According to first variant, pitch servo control is based on a feedback of the pitch position. Embodiments of the present invention propose to counteract "gravity pitching" via a feedback of a measured (or estimated) pitch position, for example as measured by one of the sensors 13a, 13b, 13c illustrated in FIG. 1. Therein, the pitch movement may trigger a feedback via the pitch servo control system to counteract the movement (assuming that the reference from the wind turbine controller did not request a move). Therein, the sensors 13a, 13b, 13c may be configured to perform an angular/position measurement directly at the blade bearing, to overcome backlash/flexibility between piston and bearing occurring if the piston position is used to estimate the pitch angle of the blade bearing.

In order to reliably perform this variant of the method of controlling the pitching system, the measurement sensors 13a, 13b, 13c may need to have relatively high resolution and sensitivity. A disturbance observer method may be introduced by comparing the measured pitch movement against the expected pitch movement. The expected pitch movement may come from an external source (for example through the model of the plant, which in this case is the pitching system) or internal source (for example pitch reference). The difference between the measured and the expected pitch movement may represent the amount of disturbance (i.e. due to gravity pitch), noise and other unmodelled dynamics. The difference may be used as a feedback signal which the controller can then use to compensate and reject the disturbance coming from the gravity pitch contribution. This method may utilize an accurate model of the plant and/or high resolution/low noise measurement system.

According to a second variant of controlling the pitching system, the pitch servo control may be based on a feedback of a load based signal. Herein, the control may be such that it is counteracted against "gravity pitching" via a torsional or load measurement. Therein, a torsional moment measured on a bearing and/or a blade root may be used to compute an injection signal to the pitch servo system that may then counteract the movement of the blade bearing or the blade. Torsional moment build-up can be compensated by the pitch servo control system before the bearing moves. Therein, it may be accounted for blade bearing friction.

According to a third variant of the method of controlling the pitching system, the pitch servo control may be based on scheduled/feedforward compensation signal. Therein, gravity pitching may be counteracted via a scheduled look up for example, wherein a control signal is injected which is based on wind speed and/or power and/or rotor speed and/or pitch angle and/or similar operational quantities. The method may employ a model that describes the expected pitch movement of the bearing as a function of rotor azimuth and other operational parameters as listed above.

Correcting for undermodelling or adaption to a specific turbine may be achieved by compensating the amplitude and/or the phase and/or the waveform shape of the injected signal based on data acquired on the turbine, for example measured pitch position. Thereby, it may be made sure that the bearing does not move when the injection signal is applied and if it does anyway, then the injection angle in the direction (phase/amplitude/waveform shape) is updated accordingly to minimize the movement. The phase, the amplitude, and the waveform shape may also be compensated using a measurement of the torsional loading of the blade and/or the bearing.

The blade is pre-bent away from the tower in its original and unloaded shape which has a significant advantage in some areas. However, it also creates a gravitational torque at the root of the blade which switches direction for each 180° azimuth rotation. This cyclic torque may be the main driver which generates the gravity pitch. As the wind speed increases, the pressure on the blade may push it back towards the tower. The dependency of the pitch mis-setting or pitch range from the wind speed is apparent from FIG. 2 above. At around 7-8 m/s, the gravity pitching disappears almost completely for the particular turbine considered. This may be because the blades on the particular wind turbine may be almost straight at around 7.5 m/s. While increasing the wind speed, the blade may be bent further towards the tower which may cause the gravity pitch to reappear above 8 m/s.

Figure 5:
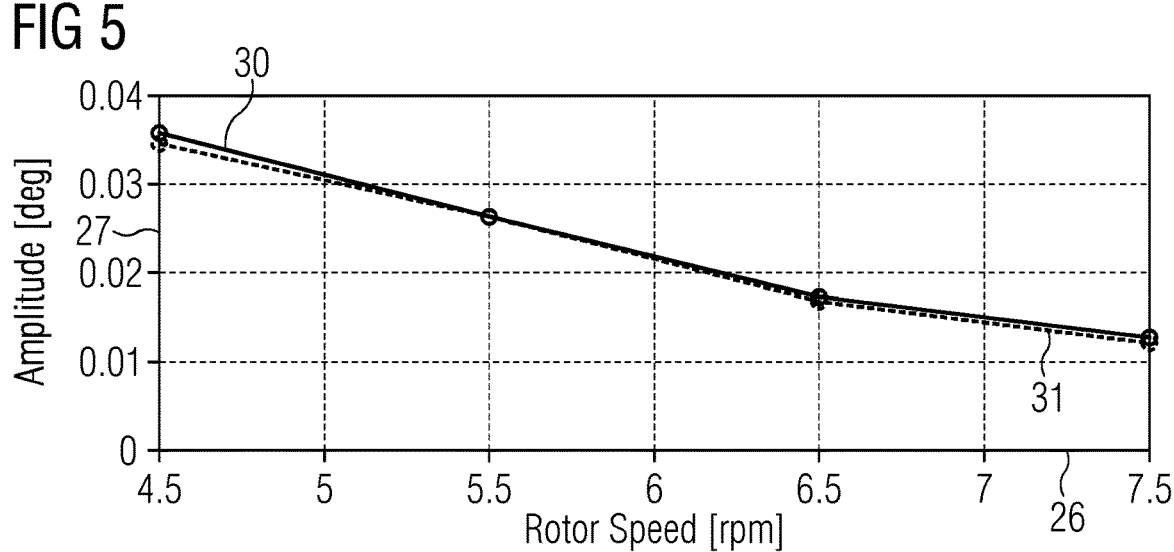
FIG. 5 illustrates a gravity pitch amplitude when changing a pitch angle in a positive direction and the curve illustrates the gravity pitch amplitude when the pitch angle is moved in a negative direction, according to embodiments of the present invention.
Figure 6:
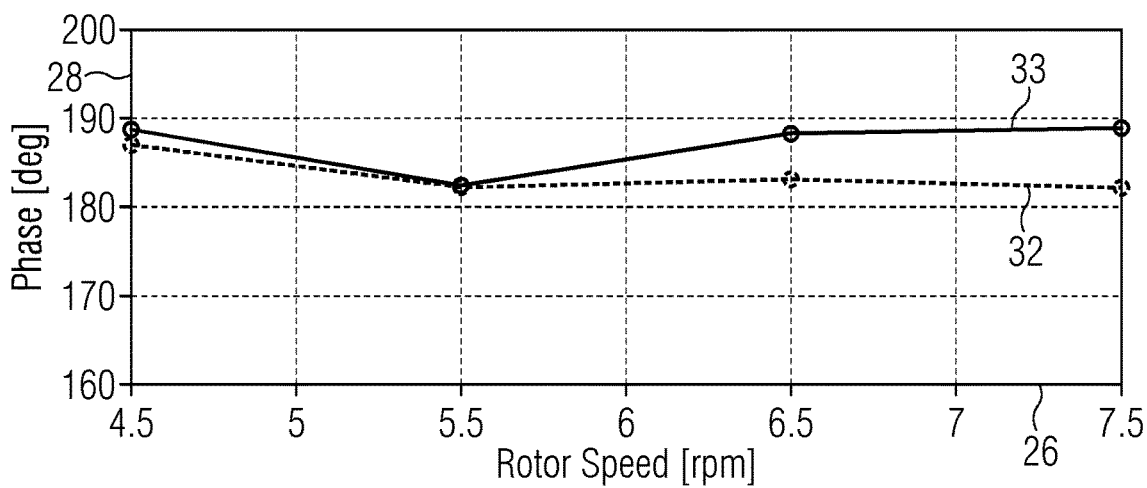
FIG. 6 illustrates a gravity pitch phase when the blade pitch is moved in a positive direction and the curve indicates the phase of the gravity pitch when the rotor blade pitch is moved in a negative direction, according to embodiments of the present invention.
Figure 7:
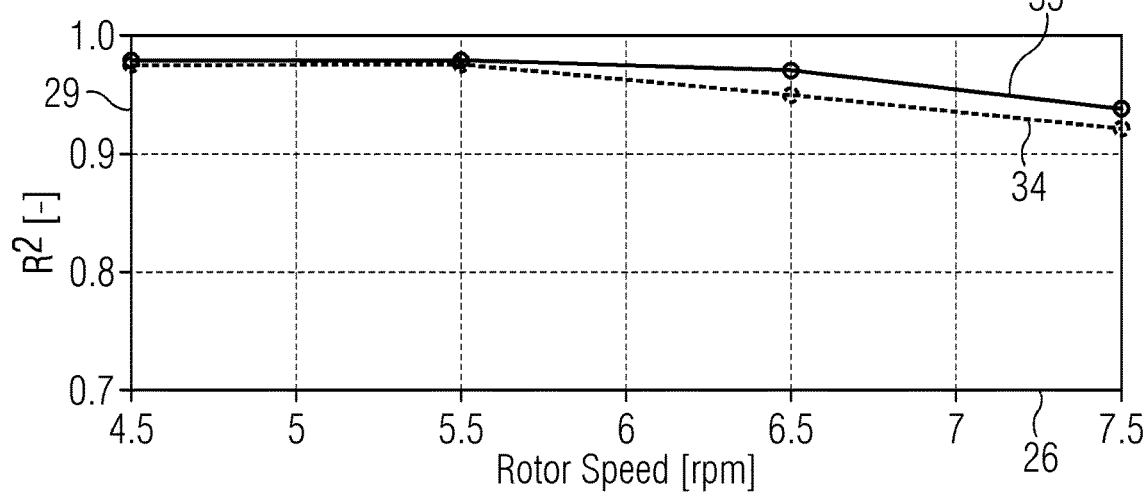
FIG. 7 illustrates a fit deviation when the rotor blade pitch is moved in a positive direction and the curve illustrates the fit deviation if the blade pitch is moved in a negative direction, according to embodiments of the present invention.

The dependency of amplitude and phase of the gravity pitch are illustrated in FIGS. 5, 6, 7. Therein, the abscissas 26 indicate the rotor speed and the ordinates 27, 28, 29 indicate the amplitude in degree, the phase in degree and a fitting deviation, respectively. The curve 30 in FIG. 5 illustrates the gravity pitch amplitude when changing the pitch angle in a positive direction and the curve 31 illustrates the gravity pitch amplitude when the pitch angle is moved in a negative direction. The curve 32 in FIG. 6 illustrates the gravity pitch phase when the blade pitch is moved in the positive direction and the curve 33 indicates the phase of the gravity pitch when the rotor blade pitch is moved in the negative direction. The curve 34 in FIG. 7 illustrates the fit deviation when the rotor blade pitch is moved in the positive direction and the curve 35 illustrates the fit deviation if the blade pitch is moved in the negative direction. The fitting deviation curves 34, 35 may allow to validate the best approximation to the waveform shape of the gravity pitch, while curves 31, 32, 33, and 34 may be used to look-up the amplitude and/or phase of the gravity pitch for different rotational speeds. Similar fittings may be performed in dependency of other operating parameters, in order to for example construct a multidimensional look up table. Thereon, based on this look up table or model, the respective control signals 10a, 10b, 10c illustrated in FIG. 1 may be determined and supplied to the respective pitching systems.

The curves 30, 31, 32, 33 may represent historical training data comprising observed gravity induced pitching in dependency of the at least one operation parameter. Similar data may be constructed by considering trial historical control signals that lead to intended compensation of the observed gravity induced pitching in dependence of the at least one operation parameter.

FIGS. 8 and 9 schematically illustrate a pitching system 3a as employed in different embodiments in two different states adopted according to embodiments of the present invention. The pitching system 3a comprises a blade pitch actuator 16a which comprises at least two pistons 36, 37 (to which embodiments of the invention is not restricted) which are guided within two respective cylinders 38, 39 which are connected to a hydraulic system 40, 41, that is driven by the control signal 10a, as is determined by the arrangement 5 illustrated in FIG. 1. The control signal 10a may comprise individual control signal portions to the different portions 40, 41 of the hydraulic system. The control signal 10a is configured to control or to drive the pistons 36, 37 in order to reduce backlash.

In the illustrated example, the root of the rotor blade 2a has respective bolts 42, 43 connected thereto. A swivel eye 44 connected to the first piston 36 is arranged to enclose the bolt 42. Another swivel eye 45 connected to the second piston 37 is guided to surround the second bolt 43 which is connected to the rotor blade 2a. The cylinders 38, 39 are via bars 46 connected to the rotor 8. By operating or moving the pistons 36, 37, the rotor blade 2a may therefore be rotated along its longitudinal axis 11a which is perpendicular to the drawing plane of FIGS. 8 and 9.

In FIGS. 8 and 9, a fluid 50 is filled within the respective cylinders 38, 39, in order to define the position of the respective pistons 36, 37. The liquid or fluid 50 is supplied by the hydraulic pressurizing system 40, 41 which is controlled by the control signal 10a.

As can be seen from FIG. 8, there is a certain play or backlash between the outer surface of the bolts 42, 43 and the inner surface of the respective swivel eyes 44, 45, leading to a certain degree of backlash or play or freedom of the rotor blade 2a to slightly move or turn or rotate around its longitudinal axis 11a. This leads to a certain play or uncertainty in the rotor blade pitch angle. In order to reduce the backlash, the pistons 36, 37 are driven in FIG. 9 in opposite directions 47, 48 (relative to the respective cylinders 38, 39), such that the respective bolts 42, 43 contact the swivel eyes 44, 45, respectively.

Thus, according to embodiments of the present invention, gravity pitching may be compensated which originates primarily from mechanical backlash, if the pitch system consists of more than one piston per blade bearing. According to an embodiment of the present invention, the pistons are controlled in "opposite" directions that will "tighten up" the system and mitigate backlash. This approach may be employed at constant pitch activation, i.e. at a constant reference pitch angle, and in particular when the torsional movement or the torsional moment fluctuates around zero.

In the situation illustrated in FIG. 8, the play between the piston rod swivel and the fixed axis on the blade root allows the blade root to move. In the situation as illustrated in FIG. 9, the pistons have been re-positioned according to an embodiment of the present invention such that the blade root cannot move despite play, even if the torque (Tb) changes sign. This embodiment may address play in the cylinder rod swivel eye but it may also be applied if the play is located elsewhere.

This embodiment may also use a torsional measurement for determining the respective control signal 10a. This measurement may be used to determine how the pistons shall be operated for example
  be tightened up (to work against each other) at a similar force/torque if the torsional moment (Tb) fluctuates around zero or
  be tightened up (work against each other) at different force/torque if the torsional moment is non-zero or
  work in the same direction in case the torsional moment is further from zero and both cylinders need to act in the same direction to overcome Tb.

It may still be possible to pitch by varying the force/torque provided between each cylinder, i.e. if one pull more than the other pushes it will generate a net torque causing a change in the pitch position.

The fourth variant may be combined with one or more features of the variants as disclosed above. Both cylinders may not be needed to act in the same direction to overcome Tb or provide a large torque to move the blade fast.

Embodiments of the present invention may enable to reduce or remove unintended pitching emerging from a passive gravity induced pitching. Thereby, pitch bearing damage may be reduced.

Additionally or alternatively to the pitch angle actuators 16a, 16b, 16c, at least one brake 15a, 15b, 15c may be installed for each blade and may be controlled by the arrangement 5. According to an embodiment of the present invention, the brake may be applied whenever the pitch angle is not supposed to change to prevent forces acting on the bearing to introduce unintended pitching. The brake or more than one brake may be located at the blade bearing, the blade interface, the pitch system, etc. There may be one or more brakes per blade. The wind turbine controller may determine when the pitching is intended—i.e. only when the controller commands the pitch angle to change via a change in the pitch reference. When the controller does not command a movement, the brake or the more than one brakes may be applied, i.e. set in a state to lock movement of the rotor blade around its longitudinal axis relative to the rotor or the hub. Braking of the pitch bearing may be achieved using mechanical brakes, locks, etc.

In operation below rated power, there may often be little active pitching, since the pitch angle may typically be set to optimize performance (for example track an optimal angle of attack) and possibly ensure some motion of the bearing for lubrication purpose. Above rate power or wind speed, often there is significant active pitching since the pitching is used to control the driving rotor torque extracted from the wind.

Braking of the pitch bearing may also be achieved by minimizing the compression of the oils and seals by closing valves on one or more of the hydraulic connections to any pitch actuator. This may lock the pitch system in place and thereby utilize the stiffness of the remaining part of the hydraulic system to allow small movements of the actuator and thereby the blade bearing. Locking the pitch actuator may further be enhanced by increasing the pressure in the pitch actuator. This solution may be relevant under the condition that a significant amount of gravity pitch cycle range is originating from hydraulic stiffness. The second contribution may be the structural stiffness, originating from deflection of piston joints, steel plates and pitch brackets.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method of controlling a pitching system of a rotating rotor blade of a wind turbine, the method comprising:
  controlling the pitching system such that unintended pitching due to gravity is reduced, wherein controlling the pitching system comprises:
  determining a control signal;
  supplying the control signal to the pitching system, wherein the control signal varies in dependence of a rotational speed of the rotor,
  the control signal comprising a component being defined by a periodic waveform function having as a repetition period the revolution period of the rotor,
  wherein the control signal is determined based on a feedback signal, wherein the feedback signal comprises:
    an actual blade torsion indicating signal indicating the actual torsion of the blade relative to a hub at which the blade is mounted,
    wherein the control signal is supplied to a blade pitch angle actuator adapted to set a pitch angle,
    wherein the blade pitch angle actuator comprises at least two pistons guided within two respective cylinders which are connected to a hydraulic system that is controlled based on the control signal,
  wherein the control signal is adapted to drive the at least two pistons in order to reduce backlash,
    wherein the control signal is determined such that to drive the at least two pistons:
    in different directions towards restricting pitching movement, in case of torsion fluctuating is around or close to zero; and
    in same direction enabling readjusting the pitch angle, if the torsion is positive or negative.

2. The method according to claim 1, wherein a waveform shape, amplitude, and/or phase of the control signal varies in dependence of a rotational speed of the rotor.

3. The method according to claim 1,
  wherein the control signal is determined as a sum of a reference pitch angle and a gravity induced pitching compensating signal, the gravity induced pitching compensating signal whose frequency varies according to the revolution period of the rotor.

4. The method according to claim 1, wherein the feedback signal further comprises:
  an actual pitch angle indicating signal, indicating the actual pitch angle of the rotor blade,
  wherein the actual blade torsion indicating signal takes into account blade bearing friction.

5. The method according to claim 1, wherein the control signal is determined by:
  comparing a measured pitch movement against an expected pitch movement;
  using the difference between the measured pitch movement and the expected pitch movement as the control signal or a part of the control signal to compensate a disturbance coming from the gravity pitch contribution.

6. The method according to claim 1, wherein the control signal is determined further based on at least one wind turbine operation parameter, comprising at least one of:
- a wind speed;
- a rotor azimuth;
- a rotor blade bending state;
- a rotational speed of the rotor;
- a rotational power of the rotor;
- a power output of a generator coupled to the rotor;
- a reference pitch angle; and
- an actual pitch angle.

7. The method according to claim 1, wherein the control signal is determined based on the least one operation parameter using at least one of:
- a model modelling gravity induced pitching in dependence of the at least one operation parameter;
- a look up table listing the control signal in dependence of the at least one operation parameter;
- historical training data comprising observed gravity induced pitching in dependence of the at least one operation parameter; and
- historical control training data comprising historical control signals that lead to intended compensation of observed gravity induced pitching in dependence of the at least one operation parameter.

8. The method according to claim 7, wherein the control signal is set to the reference pitch angle, in case the reference pitch angle is changing.

9. The method according to claim 1, wherein the pitching system comprises at least one brake, wherein controlling the pitching system comprises, in particular in case the reference pitch angle does not change, in particular below rated power:
- actuating the at least one brake, in order to reduce or prohibit unintended rotation of the blade around a longitudinal axis.

10. The method according to claim 9, wherein the brake comprises at least one of the following:
- a mechanical brake applying form fit and/or force fit; and
- a hydraulic brake.

11. The method according to claim 9, wherein the blade pitch angle actuator is configured as hydraulic actuator to be operated to act as at least a part of the brake by at least one of the following:
- minimizing compression of oil; and
- increasing pressure of oil.

12. The method according to claim 1,
- adapted to reduce load on a pitch system bearing of the rotor blade; and/or
- applied to all rotor blades of the wind turbine, wherein the control of pitching systems of adjacent blades is performed with a phase shift of 360°/n, where n is the number of rotor blades.

13. An arrangement for controlling a pitching system of a rotating rotor blade of a wind turbine, the arrangement comprising:
- a blade pitch angle actuator adapted to set a pitch angle;
- a controller adapted to:
- control the pitching system such that unintended pitching due to gravity is reduced by supplying a control signal to the blade pitch angle actuator,
- wherein the blade pitch angle actuator comprises at least two pistons guided within two respective cylinders which are connected to a hydraulic system that is controlled based on the control signal, wherein the control signal is adapted to drive the at least two pistons in order to reduce backlash,
- wherein the control signal is determined such that to drive the at least two pistons:
- in different directions towards restricting pitching movement, in case of torsion fluctuating is around or close to zero; and
- in same direction enabling readjusting the pitch angle, if the torsion is positive or negative.

14. A wind turbine, comprising:
- a plurality of rotor blades having respective pitching systems; and
- the arrangement according to claim 13, connected to control the pitching systems.

* * * * *